June 17, 1952 W. HARROWER 2,600,499

SWINGING GATE VALVE MECHANISM

Filed Sept. 25, 1948 2 SHEETS—SHEET 1

Inventor
William Harrower
By Ramsay, Chisholm & Wilder
Attorneys

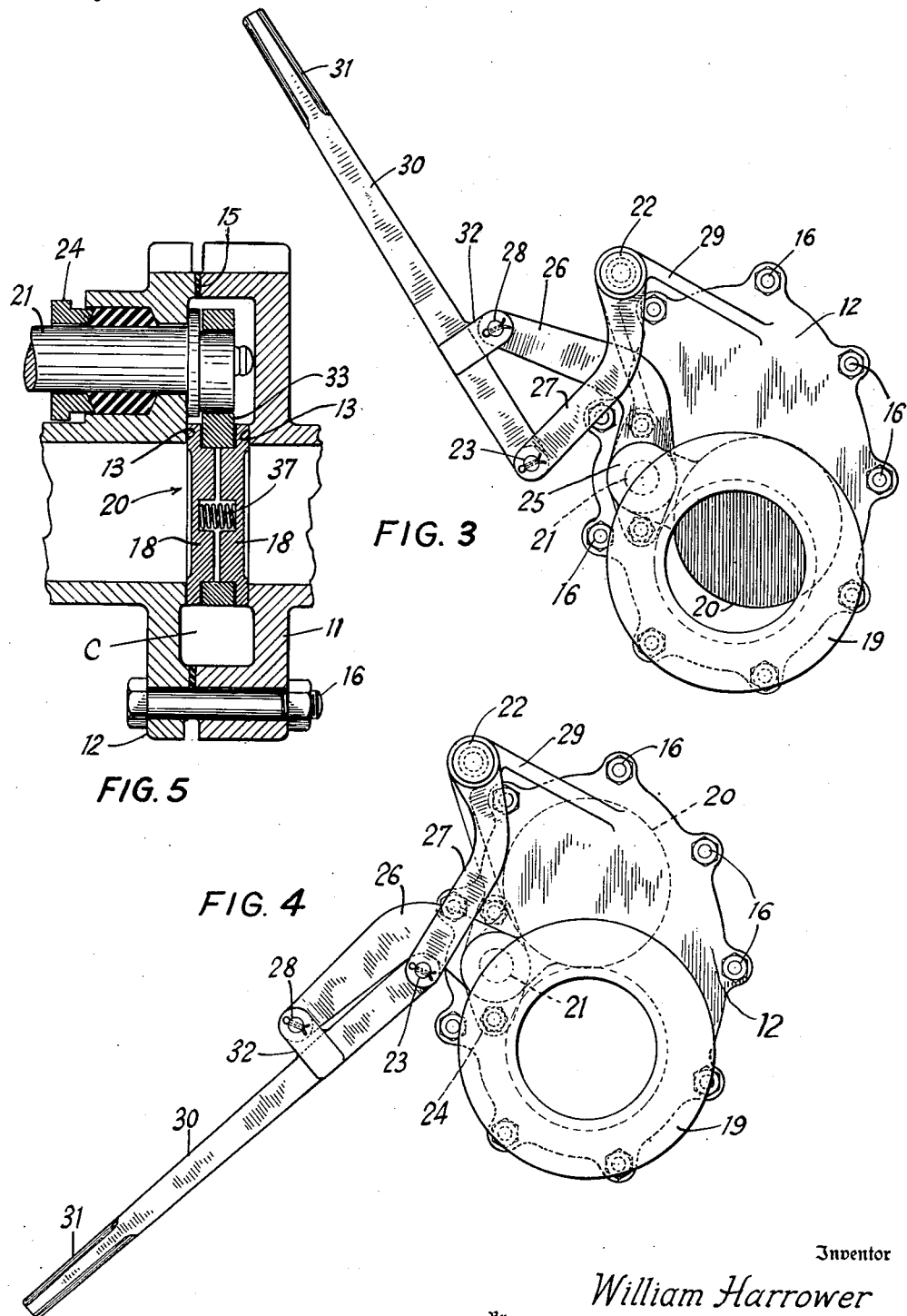

Patented June 17, 1952

2,600,499

UNITED STATES PATENT OFFICE 2,600,499

SWINGING GATE VALVE MECHANISM

William Harrower, Jersey City, N. J., assignor to Everlasting Valve Company, Jersey City, N. J., a corporation of New Jersey Application September 25, 1948, Serial No. 51,203

8 Claims. (Cl. 137—750)

This invention relates to valves and is particularly applicable to lever-operated swinging gate valves, i. e., valves in which a valve member or gate is mounted for oscillation on an axis parallel to the axis of a fluid conduit and is swingable by a lever to open and close the conduit.

In gate valves generally, when the valve is in completely closed position, the static fluid pressure on the inlet side of the valve tends to force the gate tightly against the valve seat on the outlet side of the valve. When the valve is of large size and/or the valve is used for controlling the flow of fluid maintained at high pressure, this static fluid pressure on the gate may cause the gate to bind against the valve seat to such a degree that a very large force is required to "crack" the valve, i. e., to make the initial opening movement which opens the valve a crack. Once the valve is opened a crack, the resultant fluid pressure on the inlet side of the gate is greatly reduced, and the opening movement of the gate may be continued with a much smaller force. In closing the valve the reverse effect obtains, the greatest force being required at the end of the closing movement to complete the closing of the valve. Generally speaking, it is not practicable to increase the length of the operating lever without limit to secure the mechanical advantage required for "cracking" the valve, since the space required for swinging the lever between open and closed positions becomes excessive.

In the form shown of the present invention, a swinging gate valve is provided with a valve-operating mechanism comprising a system of compound levers which furnishes greatly increased mechanical advantage for the initial opening and final closing movement of the valve. The mechanical advantage decreases as the valve is opened and increases as the valve is closed with the result that for a given angular movement of the operating lever, the gate is given a greater angular movement when it is remote from closed position. This facilitates rapid opening and closing of the valve.

An object of the present invention is to provide a lever-operated swinging gate valve having an improved operating mechanism for facilitating opening and closing of the valve.

Another object of the invention is to provide for swinging gate valves, a lever-operating mechanism having improved and advantageous operating characteristics.

A further object of the invention is to provide such a valve and operating mechanism that may be readily manufactured and easily assembled or disassembled.

Further objects, and objects relating to details and economies of construction, manufacture and use will more definitely appear from the detailed description to follow.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification in which:

Fig. 3 is an end elevation similar to Fig. 2, the valve being shown in partly opened position.

Fig. 4 is an end view similar to Figs. 2 and 3, the valve being shown in completely open position.

Fig. 5 is a fragmentary cross section through the valve body, taken generally on the line 5—5 of Fig. 2.

Figure 1:
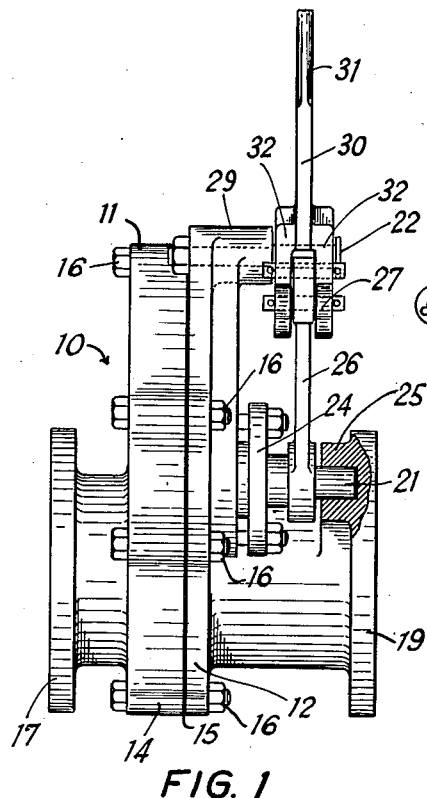
Fig. 1 is a side elevation, partially in section, showing a valve constructed according to the present invention.

Referring now to the drawings, Figs. 1 through 4 show a swinging gate valve of the type known in the trade as the "Everlasting" valve. This valve has a valve body 10 formed of a left-side bonnet 11 and a right-side bonnet 12, these bonnets defining a valve chamber C (Fig. 5) having two spaced parallel generally flat side walls. The circumferential wall of the valve chamber may be formed by a peripheral flange 14 on the valve bonnet 11. A gasket 15 may be interposed between the bonnets 11 and 12 to form a fluid-tight seal. The bonnets 11 and 12 are held together in sealed relation with the gasket 15 by a plurality of circumferentially-disposed bolts and nuts 16 which clamp extended flanges of these bonnets. The internal construction of this valve may be as shown in Fig. 5 or correspond with that shown in Wylie G. Wilson Patent No. 1,991,006, issued February 12, 1935.

The bonnets 11 and 12 are each provided with ports opening into the valve chamber C. These ports are ordinarily cylindrical and in alinement; and, in assembly with pipes, are continuations of the inner diameter of the pipes, forming a straight conduit through the valve. A valve seat 13, which may be similar to that shown in the above-mentioned Patent 1,991,006, may be provided within the valve chamber surrounding the port of at least one of the bonnets 11 and 12. Such a valve seat is provided at least on the outlet side of the valve chamber.

Terminal flanges 17 and 19 may be used to connect the valve body with similar flanges of inlet and outlet pipes, or the valve body may be threadedly engaged or otherwise connected with such pipes in any customary manner. Ordinarily each of the flanges 17 and 19 is provided with a suitable number of bolt holes (not shown) for joining flanged pipes thereto.

A circular valve member on gate 20 of diameter somewhat larger than that of the valve ports is swingably mounted within the valve chamber C for rotation on an axis parallel with the conduit defined by the valve ports. This gate, in the form shown, comprises a pair of circular-stepped discs 18, 18 (Fig. 5) which are retained within the ring-like end of a lever 33. A compression spring 37 serves to urge the discs 18, 18 against the opposite parallel sides of the valve chamber C, with which they make a lapped fit.

The other end of lever 33 is nonrotatively secured to a short valve post or shaft 21 which is journaled for oscillation in the right-side bonnet 12. Upon oscillation of the shaft 21, the gate 20 is oscillated between closed position across the valve ports and open position out of the line of the valve ports.

When in closed position, the gate 20 is acted on by pressure within the inlet port and valve chamber C to force the gate tightly against the valve seat surrounding the outlet port. The total unbalanced fluid pressure on the gate is roughly equal to the area of the gate in square inches multiplied by the difference between the inlet and outlet port pressures in pounds per square inch. This constitutes an unbalanced force on the gate 20, which forces the gate tightly against the valve seat surrounding the outlet port and aids in sealing the valve. However, in larger sizes of valves and/or valves used with large differences between inlet port and outlet port pressures, the unbalanced force on the gate may become excessive so as to cause the gate to bind against the valve seat and resist opening of the valve.

As the gate 20 is started towards open position and the valve "cracked," the pressure within the inlet and outlet ports is partially equalized, and, in addition, the area of the gate overlying the valve port and the valve seat is decreased, thus lessening the unbalanced force on the gate and reducing the frictional engagement or binding of the gate on the valve seat. As the gate is progressively moved towards entirely open position, the fluid forces on the gate become progressively more nearly balanced until at fully open position, these forces are substantially balanced. Conversely, the unbalanced fluid force on the gate increases as the gate is moved from open to closed position. Accordingly, it requires the greatest force to move the gate when the valve is in closed position, and the force required to move the gate decreases progressively as the valve is opened.

To operate the valve gate 20, the valve shaft 21 is projected through a stuffing box 24 to the outside of the valve body 10. The outer end of this shaft may be journaled in a boss 25 formed on the terminal flange 19 to furnish an additional bearing for maintaining the shaft in alinement. The shaft 21 is oscillated by valve-operating mechanism to be described and serves to correspondingly oscillate the gate 20 between closed and open position.

The valve shaft 21 is provided with a gate lever 26 having one end fixed thereto between the stuffing box 24 and the boss 25. This lever is given the curved form shown in Figs. 2 to 4 to provide clearance for the operating mechanism as will be described.

Figures 6, 7:
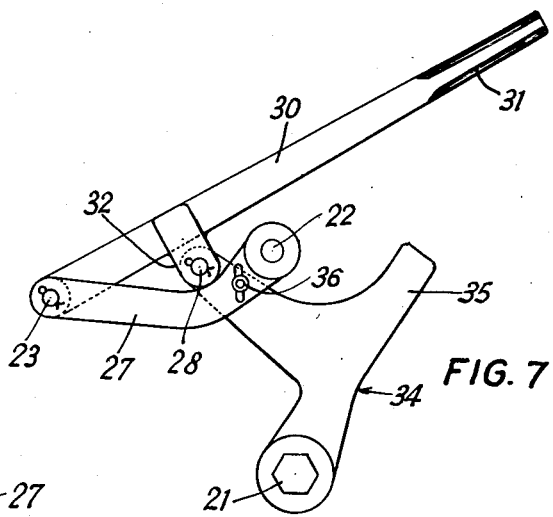
Fig. 6 is a plan view of a link of the valve-operating mechanism shown in Figs. 1 to 4.
Fig. 7 is a partly diagrammatic elevation showing a modified valve-operating mechanism for use with the valve shown in Figs. 1 to 4.

To supply a swing fulcrum for a second lever to rotate the gate lever 26, a fulcrum link 27 is provided having an end pivotally connected to the valve body 10 by a bolt 22 received in a bore in the valve body. Preferably, the right side bonnet 12 is extended outward to provide a mounting 29 for the link 27, the mounting being generally on a prolongation of the arc through which the free end of the gate lever 26 operates. The link 27 is bifurcated as indicated in Fig. 6, the space between the bifurcations of the link receiving the gate lever 26 as indicated in Figs. 1 to 4. The link 27 is given the curved form indicated in Figs. 2 to 4 to supply the necessary clearance for operation as will be described.

A second or operating lever 30 is provided, having one end thereof pivotally attached to the free end of the fulcrum link 27 by a pin 23, this end of the lever 30 lying between the bifurcations of the fulcrum link. The lever 30 is preferably straight and the opposite or free end 31 thereof is shaped to form a handle for operating the lever. Intermediate the ends of the lever 30 and preferably nearer the pivoted end thereof, there is provided a pair of laterally-extending ears 32, 32. A pin 28 passes through the ears 32, 32 and pivotally connects the intermediate portion of the operating lever 30 to the outer end of the gate lever 26. Preferably, the ears 32, 32 are located one on each side of the lever 26.

Figure 2:
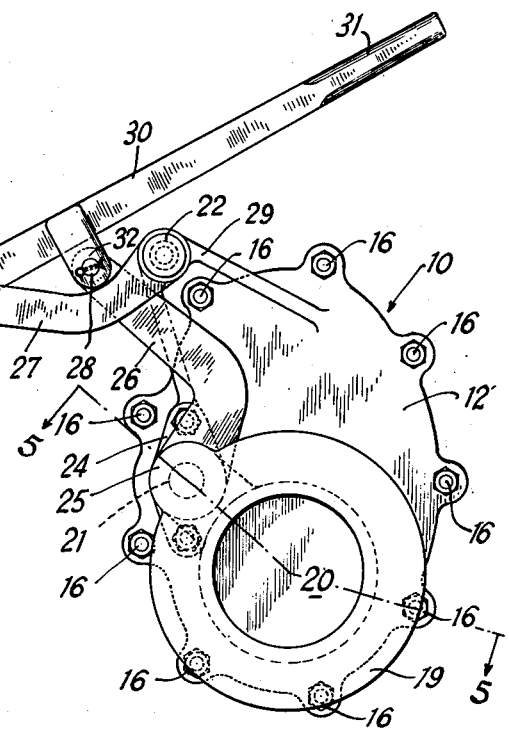
Fig. 2 is an elevation from the right-hand end of Fig. 1, the valve being shown in closed position.

When the valve is in closed position, as shown in Figs. 1 and 2, the pin 28, which connects the intermediate portion of the operating lever 30 to the free end of the gate lever 26, is substantially on a straight line passing through the pivotal axes formed by pin 23 and bolt 22. To permit the three pivots, 22, 28 and 23, to be brought in line, the link 27 is given the necessary curvature. This link also serves as a stop which, by engaging the ears 32, 32, prevents further oscillation of the operating lever 30 which might result in damage to the edge of the gate 20 or other parts of the valve if the gate were forced past its normal closed position and against the wall 14 of the bonnet 11. Such damage would be more likely with the high mechanical advantage obtained by the compound levers 26 and 30, such mechanical advantage being at its maximum when the levers are in valve-closed position.

As the operating lever 30 is swung toward open position as indicated in Fig. 3, the fulcrum link 27 also swings so as to provide a moving pivot or fulcrum for the lever 30. As the operating lever 30 is moved to completely open position as shown in Fig. 4, the gate 20 is swung completely clear of the valve ports. In the completely open position, the free end of the gate lever 26 extends generally parallel to the operating lever 30, the base of the operating lever engaging the curved portion of the lever 26 to serve as a stop to limit further opening movement.

As will be apparent from a study of Figs. 2, 3 and 4, the arrangement of the above-described operating mechanism is such that a given angular movement of the operating lever 30 results in a relatively lesser angular movement of the gate 20 when the valve is in closed position and in a relatively much greater angular movement of the gate when the valve is approaching completely open position. When the valve is in completely closed position, the mechanical advantage derived from the series of compound levers comprising the gate lever 26 and the operating lever 30 is at a maximum. This mechanical advantage is extremely large and the gate 20 is moved relatively slowly by operation of the lever 30. As the lever 30 is oscillated toward valve-open positon, the mechanical advantage continuously decreases, the relative motion of the gate 20 correspondingly increasing. Upon closing the valve, the mechanical advantage is initially relatively small and continuously increases as the gate is moved to closed position.

The above-described valve-operating mechanism furnishes a maximum mechanical advantage when the valve is closed, this mechanical advantage continuously decreasing as the valve is opened and thereby facilitating quick opening of the valve. In addition, the above-described operating mechanism provides for a greatly increased movement of the operating lever 30 in moving the valve between open and closed position, as compared with the single-lever operated valve shown in the above-mentioned Patent 1,991,006, thereby making for increased ease of operation.

This valve-operating mechanism permits the use of a lever-operated swinging gate valve under conditions where the size of the valve and/or the differential between the inlet and outlet pressures might otherwise prevent the use of a lever-operated swinging gate valve. In this manner the desirable advantages of rapid operation of the lever-operated valve are secured and further, the compound levers are so arranged that the space required for operation of the valve is not greatly increased.

In the modification shown in Fig. 7, the valve-operating mechanism there shown, which replaces the valve-operating mechanism above described, comprises a similar operating lever 30 and a similar fulcrum link 27 for connecting the operating lever to the valve body 10. In this form, the valve gate lever 34 is provided with an extension 35 which is not found on the gate lever 26 of the form above described. In addition, a thumb screw 36 is threadedly engaged within a bore in one of the legs or bifurcations of the link 27, the relationship of the thumb screw to the lever 34 being such that the lever is always under the thumb screw in all positions of the valve-operating mechanism. As the operating mechanism is moved to valve-open position, the thumb screw 36 is moved out over the extension 35 of the lever 34. By tightening the thumb screw 36 against the lever 35 in any position of the operating mechanism, the fulcrum link 27 and thumb screw are caused to frictionally engage the gate lever 34 so as to hold the valve gate 20 in any set position against fortuitous displacement.

I claim:

1. A swinging gate valve comprising a valve body having inlet and outlet ports and a valve chamber therebetween, a valve gate mounted for oscillation within the valve chamber and swingable to closed position to seal the outlet port, and valve-operating mechanism comprising a gate lever mounted for oscillation with the valve gate, a fulcrum link having an end pivotally mounted on the valve body, and an operating lever having an end pivotally mounted on the other end of the fulcrum link and an intermediate portion pivotally joined to the free end of the gate lever.

2. A swinging gate valve comprising a valve body having inlet and outlet ports and a valve chamber therebetween, a shaft journaled in the valve body and projecting within the valve chamber, a valve gate fixed to the shaft for oscillation within the valve chamber and swingable to closed position to seal the outlet port, and valve-operating mechanism comprising a gate lever having an end fixed to the shaft outside the valve body for oscillation with the valve gate, a fulcrum link having an end pivotally mounted on the valve body, and an operating lever having an end pivotally mounted on the other end of the fulcrum link and an intermediate portion pivotally joined to the free end of the gate lever, the pivot at the end of the gate lever being movable to a position between and substantially on a line with the ends of the fulcrum link as the valve is closed.

3. A swinging gate valve comprising a valve body having inlet and outlet ports and a valve chamber therebetween, a shaft journaled in the valve body and projecting within the valve chamber, a valve gate fixed to the shaft for oscillation within the valve chamber and swingable to closed position to seal the outlet port, and valve-operating mechanism comprising a gate lever having an end fixed to the shaft outside the valve body for oscillation with the valve gate, a fulcrum link having an end pivotally mounted on the valve body, and an operating lever having an end pivotally mounted on the other end of the fulcrum link and an intermediate portion pivotally joined to the free end of the gate lever.

4. A swinging gate valve comprising a valve body having inlet and outlet ports and a valve chamber therebetween, a valve gate mounted for oscillation within the valve chamber and swingable to closed position to seal the outlet port, and valve-operating mechanism comprising a gate lever mounted for oscillation with the valve gate, a fulcrum link having an end pivotally mounted on the valve body, and an operating lever having an end pivotally mounted on the other end of the fulcrum link and an intermediate portion pivotally joined to the free end of the gate lever, the pivotal mounting of the link on the valve body being located substantially on a prolongation of the arc generated by the free end of the gate lever, and the pivot at the end of the gate lever being movable to a position between and substantially on a line with the ends of the fulcrum link as the valve is closed.

5. A swinging gate valve comprising a valve body having inlet and outlet ports and a valve chamber therebetween, a valve gate mounted for oscillation within the valve chamber and swingable to closed position to seal the outlet port, and valve-operating mechanism comprising a gate lever mounted for oscillation with the valve gate, a fulcrum link having an end pivotally mounted on the valve body, and an operating lever having an end pivotally mounted on the other end of the fulcrum link and an intermediate portion pivotally joined to the free end of the gate lever, the pivotal mounting of the link on the valve body being located substantially on a prolongation of the arc generated by the free end of the gate lever.

6. A swinging gate valve comprising a valve body having inlet and outlet ports and a valve chamber therebetween, a valve gate mounted for oscillation within the valve chamber and swingable to closed position to seal the outlet port, and valve-operating mechanism comprising a gate lever mounted for oscillation with the valve gate, a fulcrum link having an end pivotally mounted on the valve body, and an operating lever having an end pivotally mounted on the other end of the fulcrum link and an intermediate portion pivotally joined to the free end of the gate lever, the pivotal mounting of the link on the valve body being located substantially on a prolongation of the arc generated by the free end of the gate lever, and the closing movement of the operating lever being limited by contact of the intermediate portion of the operating lever with the link.

7. A swinging gate valve comprising a valve body having inlet and outlet ports and a valve chamber therebetween, a valve gate mounted for oscillation within the valve chamber and swingable to closed position to seal the outlet port, and valve-operating mechanism comprising a gate lever mounted for oscillation with the valve gate, a fulcrum link having an end pivotally mounted on the valve body, an operating lever having an end pivotally mounted on the other end of the fulcrum link and an intermediate portion pivotally joined to the free end of the gate lever, and a clamping means for frictionally engaging the link with one of the levers to lock the valve-operating mechanism and retain the valve gate in any desired position.

8. In a swinging gate valve having a valve body with alined inlet and outlet ports, and having a gate oscillatable between valve-closed and valve-open position on an axis which is offset from the valve ports and disposed parallel to the direction of flow through the valve ports, a valve-operating mechanism comprising: a gate lever mounted to oscillate with the valve gate, a fulcrum link having an end pivotally mounted on the valve body, and an operating lever having an end pivotally mounted on the other end of the fulcrum link and an intermediate portion pivotally joined to the free end of the gate lever, the pivotal mounting of the fulcrum link on the valve body being located substantially on a prolongation of the arc generated by the free end of the gate lever.

WILLIAM HARROWER.

REFERENCES CITED

The following references are of record in the file of this patent:

UNITED STATES PATENTS

| Number | Name | Date |
|---|---|---|
| 1,366,502 | Scoville | Jan. 25, 1921 |
| 1,397,987 | Sheppy | Nov. 22, 1921 |
| 1,991,006 | Wilson | Feb. 12, 1935 |

FOREIGN PATENTS

| Number | Country | Date |
|---|---|---|
| 210,178 | Great Britain | of 1924 |